Dec. 10, 1940.  M. M. HOLM ET AL  2,224,349
SYNTHETIC HYDROCARBON OILS AND PROCESS OF PRODUCING SAME
Filed Dec. 31, 1934  2 Sheets-Sheet 1
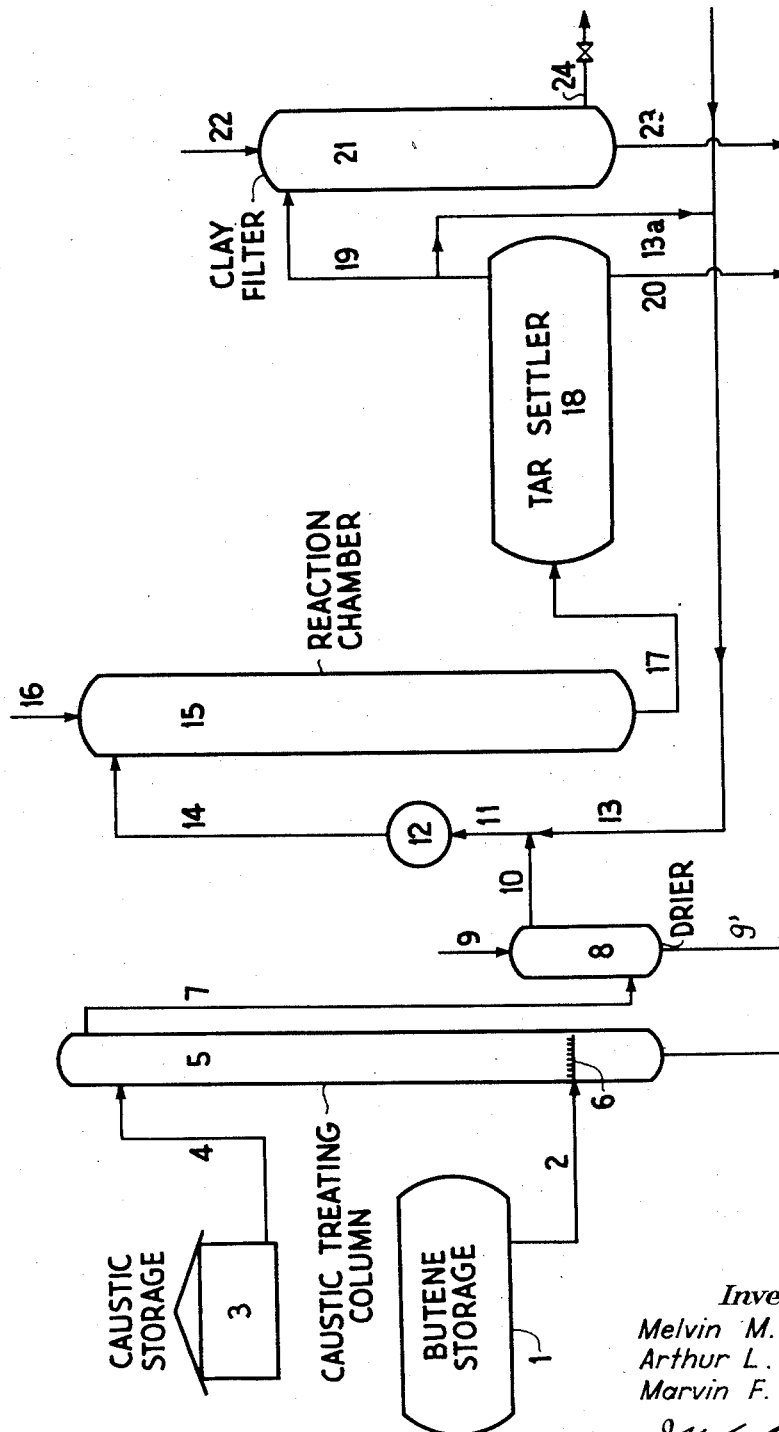
Fig. I
Inventors
Melvin M. Holm
Arthur L. Lyman
Marvin F. Miller
By J. H. Adams
Attorney Dec. 10, 1940.   M. M. HOLM ET AL   2,224,349
SYNTHETIC HYDROCARBON OILS AND PROCESS OF PRODUCING SAME
Filed Dec. 31, 1934   2 Sheets-Sheet 2
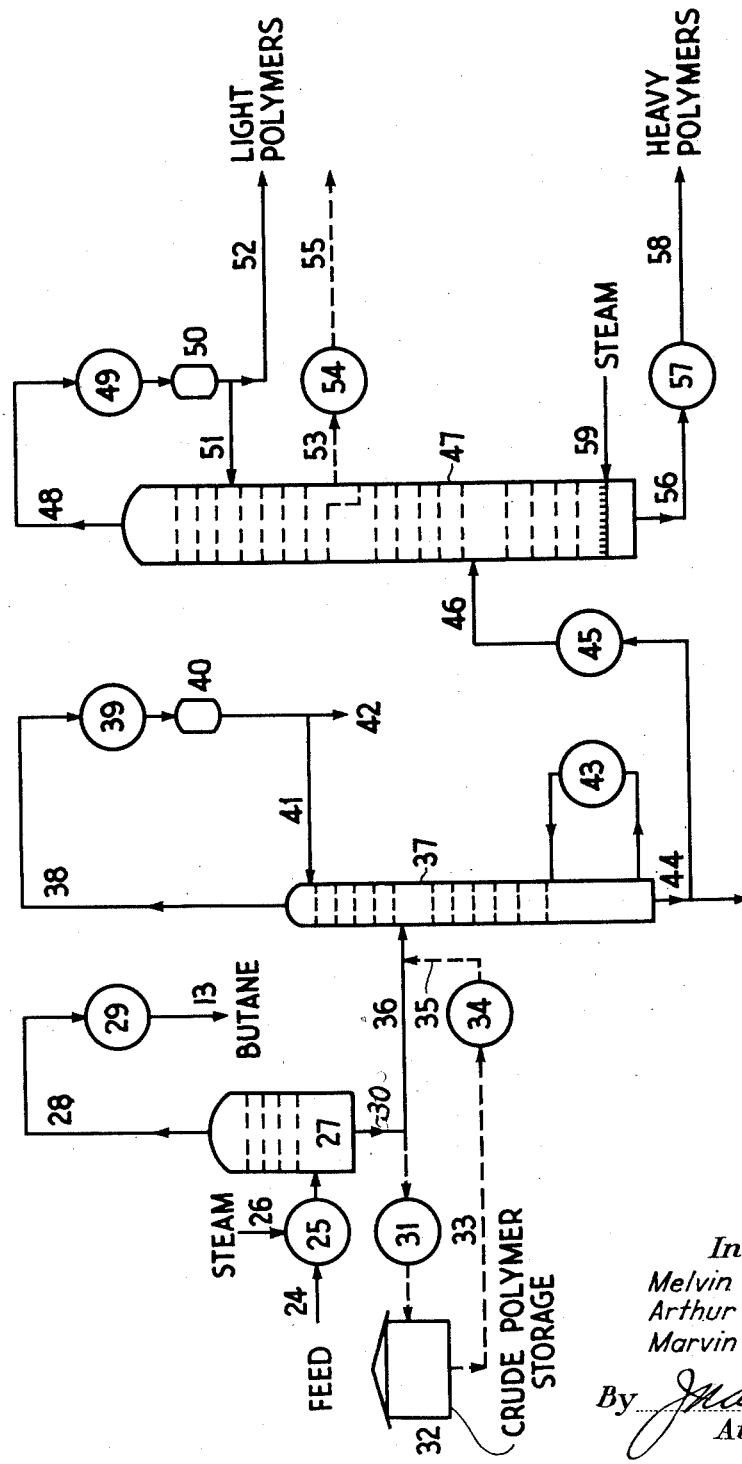
Fig. II.
Inventors
Melvin M. Holm
Arthur L. Lyman
Marvin F. Miller
By *JHAdams*
Attorney Patented Dec. 10, 1940

2,224,349

UNITED STATES PATENT OFFICE 2,224,349

SYNTHETIC HYDROCARBON OILS AND
PROCESS OF PRODUCING SAME

Melvin M. Holm, Arthur L. Lyman, and Marvin F. Miller, Berkeley, Calif., assignors to Standard Oil Company of California, San Francisco, Calif., a corporation of Delaware Application December 31, 1934, Serial No. 759,960

14 Claims. (Cl. 196—10)

This invention relates to synthetic hydrocarbon oils of high viscosity and high viscosity index, and to processes of producing the same from gaseous or low boiling olefinic hydrocarbons. More particularly, it relates to the catalytic polymerization of gaseous or low boiling point olefines under such conditions as will result in the production of olefinic polymers of high viscosity and high viscosity index. Further, it relates to the hydrogenation of the high viscosity, high viscosity index olefinic polymers produced, and to the saturated hydrocarbons, likewise of high viscosity and high viscosity index, prepared by such hydrogenation.

Ordinarily, gaseous or low boiling olefines are polymerizable to products of only relatively low viscosity; moreover, these gaseous or low boiling olefines are generally polymerizable to products of quite low viscosity index. This process differs from the prior processes in that olefinic polymers of extremely high viscosity and of extremely high viscosity index are prepared from such low boiling or gaseous olefinic hydrocarbons, and, moreover, differs from the prior processes in that it makes use of both normal or straight chain olefines and iso or branched chain olefines in the preparation of such products. The products resulting from the process of the invention are characterized by novel and useful properties not possessed by the known prior products, and new and useful functions are performed by their employment.

It is accordingly a purpose of our invention to disclose and provide synthetic hydrocarbons of high viscosity and high viscosity index, and to disclose and provide processes of preparing the same from low boiling olefines and mixtures of low boiling olefines. It is a further purpose of the invention to disclose and provide processes of preparing synthetic hydrocarbons of high viscosity and high viscosity index from low boiling olefine mixtures containing both normal and iso olefines. It is a further purpose of our invention to disclose and provide water-white, crystal-clear products of high viscosity index and of viscosity of any desired range, from moderate to extremely high viscosity, as desired, suitable for a wide variety of technical uses and possessing novel and useful properties. It is a further purpose of the invention to disclose processes of producing sulfur-free olefine polymers of extreme purity, capable of hydrogenation to produce saturated, stable hydrocarbons of novel and unusual characteristics.

In general, the process of this invention comprises segregating from its source material the desired low boiling point olefines, or a mixture of hydrocarbons containing the desired olefines, and removing therefrom such extraneous accompanying impurities as have been found of deleterious effect in the subsequent operations; cooling the olefine-containing mixture to a temperature somewhat below atmospheric; polymerizing the olefines contained in the mixture under particular conditions found to cause the formation of polymers of high viscosity and high viscosity index, such particular conditions having to do principally with suitable control of the temperature of reaction, the concentration of unreacted olefines in the mixture undergoing polymerization, and the relative proportions of normal olefines to iso olefines; removing from the polymerization reaction mixture substantially completely all reaction products other than inert hydrocarbons and polymerized olefines themselves; and separating from the mixture by distillation any desired fraction, according to the particular requirements of the material ultimately desired, as to viscosity, volatility and the like. If desired, either the whole mixture of polymers or any fraction thereof is then hydrogenated to obtain a series of saturated hydrocarbons of extreme purity and likewise of high viscosity and high viscosity index.

As source materials for the low boiling olefines found suitable for the practice of this invention, we make use of the olefine-containing gases generally produced in the thermal cracking of petroleum crude oils, distillates, or residuum, although it will be apparent that other olefine-containing materials serve as well. These petroleum cracking still gases contain considerable quantities of oelfinic materials, from ethylene and propylene up to and through the pentenes, according to the temperature and pressure under which the liquid products of the conversion operation are condensed. These olefine-containing cracking still gases are often fractionated for the recovery of certain of their constituent hydrocarbons, and we prefer to make use of those fractions or cuts containing the maximum economically available proportion of the four-carbon atom olefines, namely, butene-1, butene-2 and isobutene. Such fractions contain large amounts, generally, of saturated hydrocarbons of similar boiling points and the butene fractions referred to ordinarily contain considerable quantities of butane. Other hydrocarbons, both saturated and unsaturated, are present in lesser amounts, and the presence of ethylene, propylene and the pentenes, in lesser amounts, together with their associated saturated hydrocarbons, is of no detriment to the operation of our process.

We have found, in general, that while propylene provides suitable polymers according to our invention, it requires the use of considerably larger amounts of the polymerization catalyst, and that the pentenes while not objectionable, react under polymerization conditions much slower than do the butenes, and, moreover, tend to produce products of lower viscosity and lower viscosity index than are the products prepared from the butenes.

The saturated hydrocarbons ordinarily accompanying the olefines produced in a thermal conversion reaction, as above, while inert, have been found extremely desirable constituents of the olefine mixture undergoing polymerization, and we make no effort to segregate saturated from unsaturated hydrocarbons except in the somewhat unusual event that olefines are present in the source material only in extremely small quantities. As discussed more fully below, use is made of these accompanying saturated hydrocarbons to aid in the control of the temperature of the polymerization reaction, and their presence is desired for this reason.

The relative proportion of normal and iso olefines in the source material has been found of considerable consequence to the properties of the composition prepared, and we provide below a full discussion of the effect of this variable, together with the means of taking advantage of variations in the proportions of these reacting substances.

In the event that the gases from a petroleum conversion operation are utilized as a source material for the low boiling point olefines contemplated to be polymerized, we take particular precautions to remove all sulfur and all sulfur-containing compounds therefrom prior to the olefine polymerization reaction. Ordinarily, small quantities of hydrogen sulfide and low boiling mercaptans are present in such gaseous mixtures, and we find that serious consequences result if these and other sulfur compounds are not removed. In particular, we have found that the life of the polymerization catalyst is relatively short and that the consumption of the hydrogenation catalyst, if the composition be ultimately hydrogenated, is extremely high, if the said sulfur compounds are not substantially entirely removed.

These sulfur compounds may be removed by a careful treatment with an aqueous alkaline hydroxide, such as sodium hydroxide, with which both hydrogen sulfide and the lower mercaptans react to form water-soluble products; or they may be removed by a careful treatment with sodium plumbite solution followed by the addition of elemental sulfur to decompose produced mercaptides (the conventional "doctor" treatment) followed by careful vaporization of the sulfur-free hydrocarbons from the produced disulfides which remain as a residue; or by a combination treatment in which sodium hydroxide is used to reduce the hydrogen sulfide and mercaptan content to a minimum, followed by a plumbite treatment to remove the last traces thereof.

The sulfur-free olefinic material is, prior to subjection to polymerizing conditions, preferably thoroughly dried, and freed not only of all traces of entrained water, but also of substantially all of its dissolved water. We have found that traces of water, even of the order of the 0.02% by weight thereof which remains in clear and homogeneous solution at ordinary temperatures, is extremely detrimental not only to the consumption of polymerization catalysts, but, more particularly, that it is the cause of two very undesirable side reactions during the polymerization reaction: first, it causes the formation of minute amounts of hydrochloric acid and ultimately of minute amounts of chlorinated hydrocarbons, undesirable not only in the olefinic composition of high viscosity and high viscosity index, but more especially undesirable in the event that the olefinic composition is hydrogenated to form a completely saturated composition; second, the presence of even dissolved water causes the formation of color bodies which are difficult or impossible to remove after their formation, either from the olefinic composition or from a hydrogenated composition.

This dissolved water may be removed by any ordinary means, such as by percolation through calcium oxide or calcium chloride, by freezing out at low temperatures, etc., of which several alternative methods we prefer treatment with anhydrous calcium chloride by reason of the ease of handling both the charged and spent agent and by reason of the relatively low cost of such an operation.

The sulfur-free water-free olefinic material, preferably largely a butene containing material, is now subjected to a polymerization reaction, and as a polymerization catalyst we generally make use of anhydrous aluminum chloride, by reason of its relatively low cost and of the ease of controlling the polymerization reaction itself.

This polymerization reaction is preferably, although not in all cases necessarily, carried out at temperatures slightly below atmospheric. We have found that temperatures excessively below atmospheric are of no particular benefit to the practice of our invention, and we employ ordinarily a temperature within the range 0° F. to 40 to 80° F., depending somewhat upon the character of temperature control employed and likewise to some extent upon the proportion of normal olefines to iso olefines which exist in the olefine-containing mixture utilized. A full discussion of the effect of temperature, with which are related the effect of olefine concentration in the mixture undergoing polymerization and the effect of the proportions of normal and iso olefines existing in the mixture, is provided herein below, and at this point it will be sufficient merely to point out that for the production of high viscosity and high viscosity index olefine polymers: first, the temperature of the polymerization reaction may be allowed to go to 80° F. or even higher if the olefine concentration of the source material is relatively high, but it must be kept lower, say to 30 to 40° F. if the olefine concentration of the source material is relatively low; second, the temperature of the polymerization reaction must be kept relatively low, say to 30 to 40° F. or even lower, if the ratio of normal olefines to iso olefines is relatively high.

The first of these variables may be suitably regulated by the recirculation of unreacted inert saturated hydrocarbons such as butane, back to and through the polymerization reaction chamber prior to entry to the polymerization reaction chamber, as shown below.

The temperatures obtaining during the preliminary reaction itself may be controlled by a variety of means, among which may be mentioned: refrigeration prior to entry to the polymerization reaction chamber of a degree sufficient to allow for the maximum permissible temperature due to reaction; removal of heat of reaction by external refrigeration during the polymerization reaction; division of the polymerization reaction chamber into two or more separate units, in series, with provision for refrigeration between such units; and dilution of the reacting materials with inert materials such as saturated hydrocarbons, recycled saturated hydrocarbons, or recycled products of reaction, by which the heat of reaction is distributed and adequately absorbed. Of the olefines undergoing polymerization, iso butane, or, more generally, the iso olefines, are the most reactive, and it is therefore important that the early stages of the polymerization be effected under conditions which permit careful control of the temperature of reaction.

The anhydrous aluminum chloride catalyst chamber may be of any desired shape or character, and may suitably be packed with lump or granular anhydrous aluminum chloride over and through which the olefine-containing material may pass. We have found it convenient to pass the olefine-containing material downwardly, in liquid form, through a chamber packed with a technical, unsized grade of anhydrous aluminum chloride, and to allow the products of reaction,— both the oily hydrocarbon liquid containing dissolved produced polymers and the liquid aluminum chloride sludge which results,—to leave through a single outlet at the bottom of the chamber. This mixture of immiscible liquids is then settled in a settling chamber, to free the hydrocarbon liquid of entrained "sludge," which is to all intents and purposes useless for further production of polymers of the desired character. The anhydrous aluminum chloride necessary to the polymerization reaction is added to the chamber continuously or intermittently, generally the latter, for convenience, for we have found that the presence of considerable excess quantities of aluminum chloride catalyst is of no effect in modifying the character of the polymers produced; as used up or "spent" the catalyst liquefies into a sludge of but little further catalyzing power, and is removed from the sphere of action in any desired manner.

The complete removal of all entrained aluminum chloride sludge from the polymers, or from the polymer-containing hydrocarbon liquid, has been found of extreme importance for the production of colorless products, whether olefinic or saturated by a subsequent hydrogenation step. Complete settlement in an open or unpacked vessel is satisfactory, if sufficient time is allowed; in order to insure complete and rapid removal of entrained sludge we generally employ, however, a chamber packed with a crushed rock or other mineral substance which is inert to the materials passing therethrough and which is ground or crushed to suitable particle size to provide large surfaces on which the sludge may coalesce without, at the same time, causing unnecessarily large pressure drop through the chamber.

As a subsequent clarification step, the polymer-containing liquid is passed through an adsorbent agent such as Florida clay, charcoal or the like, both to insure positively complete removal of all entrained aluminum chloride sludge and also to entirely remove all color-forming bodies which exist in the mixture by virtue of the polymerization reactions just completed. In particular, we avoid the use of water to remove the aluminum chloride sludge, whether added as such or as steam in any steam distillation step, for such water hydrolyzes or reacts with the sludge to produce color bodies which are soluble in the hydrocarbon oils and are difficult or impossible subsequently to remove. Coincident with the formation of color bodies by hydrolysis of the aluminum chloride sludge, small amounts of hydrochloric acid and of aluminum hydroxide are formed. Chlorinated hydrocarbons result from the presence of hydrochloric acid, and the aluminum hydroxide, while inert chemically, is extremely difficult to remove in the preparation of a permanently clear and ash-free oil. The passage of the polymer-containing liquid through an adsorbent material such as a granular Florida or equivalent earth, activated carbon, etc., satisfactorily obviates the possible appearance of color bodies in the polymers ultimately segregated, and after such filtration or percolation water or steam may be allowed to come into contact with the polymers, or they may be distilled under all ordinary conditions, without hazard.

The liquid stream leaving the filtering or percolation chamber consists of olefine polymers of high viscosity and high viscosity index, diluted with the inert saturated hydrocarbons originally accompanying the gaseous or low boiling olefines; it may contain, in addition, small quantities of unpolymerized low boiling olefines if the time of contact of the olefines with the polymerizing catalyst be insufficient to effect complete utilization of the original olefines. If the original olefine-containing material is a butene-butane fraction or cut from a petroleum conversion still gas, the liquid stream consists essentially of heavy polymers diluted with butane.

The butane and accompanying low boiling hydrocarbons are separated from the heavy olefine polymers by any ordinary vaporization process, such as a flash distillation, in which the polymers are obtained as a residue and in which butane appears in vapor form in a high state of purity. This butane, or a part of it, may be suitably condensed under pressure and returned to the liquid stream of original olefine-containing material to serve as a diluent therefor in the polymerizing step, advantage being taken by this means of the heat capacity of the butane diluent to absorb the heat of the polymerization reaction and prevent undue temperature rise during the reaction.

The polymers remaining after the vaporization of the butane and associated low boiling hydrocarbons may be employed as such or they may be segregated into various cuts or fractions by ordinary processes of distillation with fractionation, according to the viscosity and/or volatility of the particular product or products desired.

Likewise, the entire polymer product, or any desired fraction or cut thereof, may be subjected to a saturating, non-destructive hydrogenation, at superatmospheric temperature and superatmospheric pressure and in the presence of a suitable hydrogenating catalyst, such as finely divided catalytic nickel, to prepare completely hydrogenated, stable, colorless, odorless and absolutely tasteless products of high viscosity index and of any desired viscosity and/or volatility.

The entire olefine polymerizing operation, together with the preliminary and subsequent purification operations, will be best understood by reference to the attached flow diagrams, which, together with the explanatory paragraphs below, are descriptive of a preferred embodiment of the process of our invention when the same is carried out to obtain high viscosity and high viscosity index polymers, employing a butene-butane fraction recovered from the gases produced in a petroleum conversion or cracking operation of the usual type.

In the drawings, Figure 1 represents diagrammatically a system for the polymerization of the low boiling or gaseous olefines, and Figure 2 represents diagrammatically a system for separating unreacted or inert low boiling hydrocarbons from the produced polymers and for separating the whole produced polymer product into such fractions or cuts as may be desired for particular purposes.

In such a particular embodiment of the process of our invention:

The gases produced in the thermal conversion or cracking of the petroleum gas oil or residuum are fractionated to remove the greater part of the hydrocarbon component of pentane and higher boiling point and of propane and lower boiling point. Such a fraction may be composed of the following hydrocarbon ingredients, in which typical proportions are represented, which proportions, however, vary considerably according to the type of oil cracked and according to the character of the cracking operation:

| | Liquid volume percent |
|---|---|
| Propylene | 1.0 |
| Propane | 4.0 |
| Iso butene | 15.0 |
| Butenes 1 & 2 | 28.0 |
| Butanes | 50.0 |
| Pentanes | 2.0 |

In addition to these hydrocarbon ingredients, methyl mercaptan may also be present at times in quantities as high as 0.5 liquid volume percent. Such a fraction is liquefied and is held at atmospheric temperature and under its own vapor pressure in a storage vessel such as vessel 1 in Figure 1.

This butane-butene fraction is led, preferably continuously, through the line 2, to a point near the bottom of a vertical washing or scrubbing tower 5, entering the same through a distributor plate 6.

A dilute aqueous alkaline hydroxide solution, for example, a 4° to 16° Baumé sodium hydroxide solution, in suitable amount, is continuously fed from the caustic soda storage tank 3 through the line 4 to a point near the top of the scrubber 5, suitably also through a distributor plate (not shown). The quantity of aqueous alkali required to reduce the hydrogen sulfide and mercaptans to an acceptably low concentration varies considerably with the source of the butane-butene fraction and particularly with the origin of the petroleum oil originally subjected to the conversion process. In the case of materials obtained from California petroleum, generally considered to be of high sulfur content, we have found that about 0.1 volume of 8% sodium hydroxide solution per volume of liquid hydrocarbon material is sufficient to reduce sulfide and mercaptan sulfur to a point below about 0.005% by weight.

Spent or partially spent aqueous caustic soda solution, settled free of entrained hydrocarbons, is removed from the bottom of the scrubbing tower 5 and the sulfur-free hydrocarbon liquid, settled free of entrained aqueous liquor, passes from the top of the tower 5, through line 7, to a drying chamber 8.

The drier 8 is packed with lump anhydrous calcium chloride, periodically replaceable through lines 9 and 9', provided with suitable means for introducing and removing the solid drying agent (not shown).

The dried hydrocarbon liquid, preferably dried to a degree such that no cloudiness appears when a sample of the liquid is cooled to a temperature of 30 to 40° below zero Fahrenheit, leaves the drying chamber through the line 10, and passes into the line 11 and through the cooler 12.

In the line 11 the charged olefine-containing hydrocarbon liquid is joined by a stream of condensed hydrocarbons flashed off from the produced olefine polymers at a later step in the process, discussed hereinbelow, which is recycled into and through the polymerizing chamber together with the charged olefines in order to aid in the control of the polymerizing action. Ordinarily this recycled liquid consists largely of butane, but it may contain, as well, variable though smaller amounts of other saturated hydrocarbons and such inconsiderable amounts of unreacted low boiling olefines as may have passed through the system without polymerization. In a preferred embodiment of the process of the invention, about three volumes of this recycled "butane" is employed per volume of "butene-butane" which enters the polymerization system as through the line 10. In the system represented in Figure 1, this recycled butane, in liquid form, is returned through the line 13 and is cooled, together with the incoming stream from line 10, in the cooler 12. Alternatively, a part of the butane-polymer stream leaving the tar settler 18 (or, more preferably, leaving the filter 21) may be recycled to and through the polymerization chamber 15, as by the lines 13a, 13, 11 and 14, in lieu of the butane flashed off at a later step, to serve as an aid in controlling the temperature of the polymerization reaction; such an alternative procedure accomplishes the desired end and effects a considerable heat economy over the recycling of butane itself, as described.

The hydrocarbon liquids are cooled in cooler 12 to about 0° F. and pass into the top of the polymerizing chamber 15 through the line 14.

The size and shape of the reaction chamber 15 may vary considerably, depending upon the degree of completeness of polymerization sought and upon the olefine concentration of the olefine-containing material. We have found, in general, that the polymerization reaction is relatively rapid, and that for the polymerization of about 90% of the olefines contained in a charged material of the character hereinabove exemplified, a vertical tower with an effective catalyst volume of about 0.12 to about 0.16 cubic feet per gallon of the above liquid mixture per hour is of adequate size.

Upon passage downwardly over and through the polymerizing catalyst in the reaction chamber 15, the olefines are polymerized to high viscosity, high viscosity index olefinic hydrocarbons, which polymerization reaction is accompanied by a rise of temperature in the chamber and in the liquid stream therein. In a typical case, employing a butene-butane fraction composed as tabulated above, admixed with three times its volume of recycled "butane," the stream enters the chamber through the line 14 at about 0°F. The temperature rises as the earlier and most significant polymerization reactions take place, and the temperature of the mixed stream leaving the bottom of the reaction chamber through the line 17 is about 80–100° F.

As the polymerization reaction proceeds, the anhydrous aluminum chloride catalyst changes slowly from solid form to a mobile liquid, and as this liquid or spent catalyst appears it flows by gravity to the bottom of the reaction chamber and is removed from the chamber, together with the hydrocarbon stream containing produced polymers, through the line 17.

Fresh catalyst is introduced through the line 16, which is provided with suitable means for continuous or periodic entry of lump or granular solid materials (not shown). The quantity of catalyst required to be employed is found to depend upon the character of the olefine-containing material introduced, and also upon the degree of completeness of the polymerizing reaction sought to be accomplished in a single operation; we have found, in general, that for a stock similar to that here particularly exemplified, about 0.05 lb. of anhydrous aluminum chloride per gallon of original olefine-containing hydrocarbon liquid will cause the polymerization of about 90% of the olefines contained therein. In the preferred embodiment of the process, in which uniform feed is maintained in lines 10 and 13 into the reaction chamber, and uniform temperature is maintained in the line 14, the temperature obtaining in the line 17 is a guiding point of observation for the desirability of replenishing the supply of fresh catalyst, if the feed of catalyst is not also kept more or less continuous and uniform.

The mixture of hydrocarbon liquid and mobile spent catalyst leaving the reaction chamber enters a settling vessel 18 through the line 17, as shown. The vessel 18 may be open or unpacked, but may be suitably packed with high silica rock or other inert material which serves to provide extensive surfaces upon which the liquid particles of mobile sludge coalesce or agglomerate. By such means the overall size of the settling chamber is markedly reduced, and clarification of the hydrocarbon stream rendered more easily certain. Spent aluminum chloride sludge, substantially free of entrained hydrocarbons, leaves the bottom of the settler through line 20, and the substantially completely clarified hydrocarbon stream leaves the top of the settler through the line 19 and enters the top of a vessel 21, packed with an adsorbent earth such as a Florida clay, charcoal or the like, suitably ground to 30 to 60 mesh fineness. Upon passage downwardly through the chamber 21, all remaining aluminum chloride sludge, and, in addition, all color-forming bodies are removed by the adsorbent contained therein.

The material employed as adsorbent agent in chamber 21 is periodically removed through line 23 and is replenished through line 22, both suitably provided with means for withdrawing and introducing solids of the character employed (not shown), or two or more such towers may be employed in parallel, the stream from line 19 being diverted from one to another of the towers as the adsorbent material in one of them is desired to be replaced.

The stream of hydrocarbon liquid leaving the clay filter or percolation chamber 21, through line 24, is crystal-clear and absolutely water-white. It consists in greater amounts of inert hydrocarbons accompanying the original olefine-containing material employed, together with the "butane" recycled through line 13, but contain in solution the high viscosity, high viscosity index polymers produced in the polymerizing reaction effected in chamber 15.

In the typical case here exemplified, the continuous feeding of about 840 gallons per hour of liquefied butane-butene fraction composed as hereinabove tabulated (all volumes hereinafter mentioned being referred to as volumes at 60° F.) consume about 42 lbs. per hour of anhydrous aluminum chloride, to produce about 210 gallons per hour of viscous polymers. In such a typical case, the oily throughput rates in lines 10, 13, 14 and 24, together with the approximate liquid volume percentage composition of the streams of each of these points, appear in the following tabulation:

| Stream No. | 10 | 13 | 14 | 24 |
| --- | --- | --- | --- | --- |
| Stream, gals./hr.@ 60° F | 839 | 2,517 | 3,356 | 3,257 |
| Stream, lbs./hr | 4,200 | 12,600 | 16,800 | 16,758 |
| Propylene-liquid vol., percent | 1.0 | 0.8 | 0.8 | 0.8 |
| Propane liquid vol., percent | 4.0 | 6.3 | 5.7 | 5.9 |
| Isobutene, liquid vol., percent | 15.0 | 0.0 | 3.8 | 0.0 |
| Butenes-1-2, liquid vol., percent | 28.0 | 10.2 | 14.6 | 9.5 |
| Butanes, liquid vol., percent | 50.0 | 79.6 | 72.2 | 74.4 |
| Pentanes, liquid vol., percent | 2.0 | 3.2 | 2.9 | 3.0 |
| Polymers, liquid vol., percent |  |  |  | 6.4 |

In the polymerizing system here particularly described as a preferred embodiment of our invention, it remains to free the produced polymers from the inert and unreacted low boiling materials accompanying them, and to separate the produced polymers into such cuts or fractions as may be desired, according to the viscosity or volatility of the olefinic product desired, as well as according to the character of the saturated, hydrogenated products desired ultimately to be prepared therefrom.

Such a separation system, designed to accompany the polymerizing system shown in Figure 1, may be conveniently comprised of the several vaporizing and condensing elements shown in Figure 2.

With reference to Figure 2:

The polymer-containing stream discussed above, water-white and crystal-clear, consisting in major part of liquefied normally gaseous hydrocarbons and containing the produced polymers in solution, is introduced into a flash chamber 27, the liquid contents of which are held at a temperature sufficient to vaporize the butane, pentane and like low boiling hydrocarbons and cause their removal in vapor form. Steam may conveniently be employed as a vaporizing agent, preferably, however, with closed steam coils rather than by direct introduction into contact with the hydrocarbon stream; thus steam may enter a set of heater coils 25 through line 26, as shown, or the said coils may be placed in the bottom of the flash chamber itself.

Light hydrocarbon vapors are removed from the vaporization vessel 27 through the line 28 and condensed in condenser 29, from which a part of the condensed "butane" may be led through line 13 for recycling into and through the olefine polymerization chamber (in Figure 1, through line 13, cooler 12 and line 14). The "butane" not employed in the recycling operation may be disposed of as desired; obviously it is a highly purified liquid, substantially free of all non-hydrocarbon impurities.

The polymers, stripped of normally gaseous hydrocarbons, leave the flash still through line 30 and pass through cooler 31 to storage vessel 32.

The polymers contained in the vessel 32 may constitute the end product of the process of our invention, or, as may be in most cases desirable, these polymers may be separated into various cuts or fractions, either for use as such or for hydrogenation into completely saturated series of hydrocarbons.

For a convenient separation into three or more fractions, the polymers may pass from the vessel 32 through heater 34 and lines 35 and 36 to atmospheric pressure fractionating tower 37, or, if the entire polymerization and fractionating systems be made both continuous, the polymers may pass from the bottom of the flash chamber 27 through lines 30 and 36 directly to the fractionating column 37.

In the typical case here particularly exemplified, from 10 to 15 or thereabouts percent by volume of the whole polymers are found to be of substantially gasoline and kerosene boiling point range. and such a proportion of the whole polymer products is accordingly taken off in vapor form from the tower 37; these vapors leave through line 38. are condensed in condenser 39 and are collected in vessel 40, from which part of the liquid is returned to the vessel 37 through line 41. for refluxing, and part removed through line 42 to storage. for admixture with treated motor fuel, for utilization as solvent, thinner and the like. As will be obvious, the material is substantially entirely olefinic, and contains no paraffinic. aromatic or hydroaromatic bodies, and is of extremely high purity insofar as concerns contamination with non-hydrocarbon substances.

When saturated by a non-destructive hydrogenation, these gasoline and/or kerosene boiling point fractions are found to be of pleasant odor and are extremely stable to oxidation and/or gum and color formation, distinguishing them from light distillates obtained from natural petroleum oils; as a consequence of this marked stability they leave no residual odor upon contact with fabrics, etc., and are of high value as components of liquid coating compositions, cleaning fluids and the like. Such hydrogenated products are, moreover, of very high non-detonating value when used alone or in admixture with other hydrocarbons, as motor fuels.

Fractionation of any desired degree is maintained in the tower 37 by suitable control of reflux and by suitable temperature maintenance at the base of the tower, as by means of heater 43.

Again, if a polymer product stripped only of relatively volatile olefinic components, such as those of the gasoline and kerosene boiling point range, is desired to be produced, the stream leaving the bottom of the tower 37, through line 44, may be cooled and led to storage (not shown).

If further segregation is desired to be made between polymers of different viscosities or volatilities, however, the stream from atmospheric pressure tower 37 is led through line 44 to heater 45 and through line 46 to reduced pressure distillation and fractionation unit 47, where an overhead fraction of "light" polymers is removed in vapor form through vapor line 48 and a bottoms fraction of "heavy" polymers is removed in unvaporized form through line 56. Such a segregation may obviously be made into any desired pair of components, or further fractions may separately be removed, as through line 53 from a suitable liquid trap at a desired place in the fractionating column.

The vapors leaving the tower through the line 48 are condensed in condenser 49 and held in container 50, from which liquid is returned through line 51 to serve as reflux in the tower, and from which the "light" polymers are removed to storage through line 52. The "heavy" polymers leaving in liquid form at line 56 are cooled in cooler 57 and lead through line 58 to storage. An intermediate fraction or cut, if such a cut be collected, is cooled in cooler 54 and led through line 55 to storage.

Any convenient heating means may be employed at the base of the reduced pressure unit 47, such as open steam introduced through line 59, caused to enter through a distributor plate 16 (not shown). Likewise, any convenient means for maintaining reduced pressure in the column 47 may be employed, such as a vacuum pump, a steam jet or water jet (not shown).

Obviously the particular system employed in segregating the whole polymer products into desired components is a function of the character of the components sought to be recovered, and the system here exemplified is intended to serve only as a particular embodiment of such a system.

In continuing the above typical exemplification of the process of our invention, the stream in line 24, in volume and of composition tabulated above, is freed of butane and analogous normally gaseous hydrocarbons in the flash vessel 27 and the produced "whole polymers" led to storage vessel 32. These polymers are obtained in a yield of about 210 gallons per hour (at 60° F.), and have an A. P. I. gravity at 60° F., a viscosity and a viscosity index about as follows:

A. P. I. Gravity, 33.7°
Viscosity, 1180 Seconds Saybolt at 100° F.
Viscosity, 103 Seconds Saybolt at 210° F.
Viscosity Index, 105 (By Dean & Davis System, Chemical & Metallurgical Engineering, Vol. 36, Pages 618–9, 1929).
Viscosity-gravity constant, 0.76 (By Ferris et al. system, Ind. Eng. Chem., 23, 753, 1931).

These polymers, when led to column 37 for the removal of gasoline and kerosene boiling point stocks, produce about a 10 volume percent yield, in line 42 of light olefines boiling between about 250 and about 500 degrees F., when the vapor line temperature in 38 is maintained at 300° F. and the temperature in the bottom of the column 38 is held at about 550° F.

The passage of the bottoms from column 37 through reduced pressure column 47 causes the separation of the polymers into further fractions as follows:

Temperature at 48, °F._____ 450
Temperature at 56, °F._____ 570
Pressure in 47, inches mercury absolute____ 1.4
Light Polymers, Line 52:
    Yield, gallons per hours_____ 116
    Gravity, A. P. I._____ 37.4°
    Viscosity at 210° F._____ 55
Heavy Polymers, Line 58:
    Yield, gallons per hour_____ 73
    Gravity, A. P. I._____ 25.5°
    Viscosity at 100° F._____ 172,000
    Viscosity at 210° F._____ 3,000
    Viscosity Index_____ 107
    Viscosity-gravity constant_____ 0.71

In further particularization of certain significant features of the foregoing polymerization process:

I. Effect of presence of sulfur compounds

As noted hereinabove, the life of an aluminum chloride catalyst has been found to be remarkably and unexpectedly shortened if substantially all sulfur compounds are not removed from the olefine-containing material prior to contact with the catalyst.

For example, in polymerization reactions designed to determine the life of anhydrous aluminum chloride as catalyst, we have found that the presence of 1.3% of hydrogen sulfide by weight allowed the formation of 1.0 gallon of propylene polymers per pound of completely spent aluminum chloride, when the polymerization reaction was carried out at 70° F. with the propylene-containing hydrocarbon fraction held in liquid phase. Under the same conditions and from the same propylene-containing fraction, but after the complete removal of hydrogen sulfide by careful scrubbing with aqueous sodium hydroxide solution, 3.7 gallons of propylene polymers were produced per pound of completely spent catalyst.

Again, a butane-butene fraction such as that described above in connection with a preferred embodiment of our invention, containing about 0.52% by weight of methyl mercaptan, contacted in liquid phase with anhydrous aluminum chloride to complete exhaustion, produced a yield of 2.2 gallons of butene polymers per pound of catalyst, the polymerization reaction in this case being maintained at 100° F. Under the same conditions and from the same butane-butene stock, but after complete removal of mercaptans by careful treatment with plumbite solution followed by the addition of elemental sulfur and careful vaporization of hydrocarbons from the produced disulfides, 18.3 gallons of polymers were obtained per pound of completely spent catalyst.

Over and above the effect of the presence of sulfur compounds on the life of the polymerizing catalyst, sulfur compounds have a marked effect on the consumption of the hydrogenation catalyst, such as finely divided catalytic nickel, used to hydrogenate part or all of the produced olefine polymers. Thus it appears that sulfur compounds are not entirely removed by reaction with the polymerization catalyst, in spite of the fact that the length of life of the polymerization catalyst is remarkably shortened by their presence; on the contrary, some at least of the sulfur compounds are polymerized, if allowed to be present, to higher boiling sulfur-containing compounds, difficult or impossible to remove from the produced olefine polymers after their formation. These sulfur compounds, if allowed to form and become a component of the viscous polymer mixture, decrease in many cases the number of services to which the polymers may be put, and, in addition, cause the consumption of markedly increased amounts of catalytic nickel necessary to be used in a saturating, non-destructive hydrogenating reaction. For example, even so small a quantity as 0.005% by weight of either hydrogen sulfide or mercaptan sulfur in the original olefine-containing material has been found to be of effect on the quantity of nickel catalyst required to hydrogenate the polymers prepared in accordance with the process of this invention.

Accordingly, the substantially complete removal of all sulfur compounds, prior to the polymerization steps of the process, is a particular feature of our invention.

II. Effect of presence of water

Likewise, as noted hereinabove, the presence of even small quantities of water in the olefine-containing material passing to the polymerization reaction chamber is carefully avoided. The major part of even that dissolved water which is held in homogeneous solution at ordinary temperatures in a liquefied source material is desirably removed, as by the means hereinabove specified.

Small amounts of water have been found to have an appreciable effect on the length of life of the polymerization catalyst, but over and above such effect is the fact that small quantities of chlorinated hydrocarbons are produced by virtue of the formation of hydrochloric acid in the polymerization chamber and the interaction of hydrochloric acid and olefinic polymerized bodies, whereby the utility of the various viscous polymers is lessened for many purposes, and the fact that such chlorinated hydrocarbons, if allowed to be formed, have been found to markedly increase the consumption of the catalytic material such as finely divided catalytic nickel, employed to saturate the olefinic hydrocarbons in the production of paraffinic products of high viscosity and high viscosity index.

Further, the presence of water is carefully avoided at all such steps and places in the system as contain any aluminum chloride sludge or reaction products other than strictly hydrocarbon bodies: first, since such products hydrolyze upon contact with water to form certain oil-soluble bodies of detrimental effect to the color of the ultimately produced olefine polymers and hydrogenated paraffinic oils; second, since the aluminum hydroxide also formed is only very difficultly filterable or otherwise completely removable. Thus all contamination with water or steam is rigidly guarded against in the sludge settling vessels, clay or other adsorbent filters or percolation chambers, and the like. After complete removal of such sludge, water or steam may be allowed to come into contact with the hydrocarbon bodies, without hazard.

Accordingly, the substantially complete removal of water and the rigid exclusion of water or steam, prior to and during the polymerization reaction and at all points prior to complete removal of aluminum chloride sludge, is a particular feature of our invention.

III. Effect of concentration of olefines in the polymerization reaction mixture and effect of temperature of polymerization reaction The temperatures maintained during the polymerization reaction, as well as the concentration of low boiling olefines in the olefine-containing reaction mixture undergoing polymerization, and also the relative proportions of normal and iso olefines in the olefine-containing mixture undergoing polymerization, have a material effect upon the viscosity and the viscosity index of the polymers produced in carrying out the process of our invention. The effect of each of these several variables is separately determinable, and the conditions obtaining in the polymerization system may be regulated to take advantage of each of these separate variables, according to the olefine-containing source materials available and according to the character of the products ultimately desired. Although separate, the effects of these variables are interlocking, as will be apparent from a careful consideration of the results obtained in the several particular exemplifying runs shown below, chosen to bring out such effects, separately and together:

| Example | 1 | 2 | 3 | 4 | 5 | 6 | 7 | 8 | 9 | 10 |
|---|---|---|---|---|---|---|---|---|---|---|
| Temperature of reaction, °F | 100-112 | 100-110 | 100 | 38-49 | 0 | 50 | 100 | 30 | 40 | 30 |
| Butene-containing stream to reaction chamber: | | | | | | | | | | |
| Vol. percent isobutene | 10.0 | 5.0 | 1.0 | 5.0 | 0.30 | 0.30 | 0.30 | 15.0 | 25.0 | 2.0 |
| Vol. percent normal butenes | 0 | 0 | 0 | 0 | 0.70 | 0.70 | 0.70 | 30.5 | 0 | 29.0 |
| Vol. percent total butenes | 10.0 | 5.0 | 1.0 | 5.0 | 1.0 | 1.0 | 1.0 | 45.5 | 25.0 | 31.0 |
| Characteristics of produced polymers: | | | | | | | | | | |
| Butane free— | | | | | | | | | | |
| Vis. @ 100° F | | | | | | | | 6,670 | 459 | |
| Vis. @ 210° F | | | | | | | | 374 | 71 | |
| Viscosity index | | | | | | | | 112 | 127 | |
| Topped at 450° F. and 20 mm. mercury pressure— | | | | | | | | | | |
| Vis. @ 100° F | 2,935 | 1,430 | 1,980 | 9,850 | | | | 40,300 | | |
| Vis. @ 210° F | 135 | 78 | 84 | 550 | | | | 1,068 | | |
| Viscosity index | 66 | 13 | −17 | 115 | 77 | 16 | −8 | 104 | | |
| Topped at 420° F. and 50 mm. mercury pressure— | | | | | | | | | | |
| Vis. @ 100° F | | | | | | | | | | 420 |
| Vis. @ 210° F | | | | | | | | | | 52 |
| Viscosity index | | | | | | | | | | 35 |

In the examples tabulated above, substantially complete polymerization of all butenes charged was obtained.

A careful consideration of the results obtained in the runs tabulated above leads to the following general conclusions:

1. If the olefine-containing source material is of very low olefine content, or if the stream entering the polymerization reaction chamber be so diluted with saturated hydrocarbons as to be of very low olefine content, the temperature of the polymerization reaction must be maintained low if high viscosity index polymers are desired to be produced (compare runs 1, 2 and 3 and runs 5, 6 and 7).

2. If the olefine-containing source material, or the olefine-containing stream entering the polymerization reaction chamber, is of fairly high olefine content, the temperature of the polymerization reaction may be quite high and a high viscosity index product nevertheless be obtained (see run 1), but the lowering of the temperature of the polymerization reaction causes an increase in the viscosity index of the product even in that event (compare runs 2 and 4).

3. The substantial absence of isobutene from the olefine-containing material originally employed decreases somewhat the viscosity index of the polymers ultimately obtainable (see run 10 and compare run 8).

From the above considerations read in connection with the tabulation, it will be obvious that the conditions chosen for the carrying out of the polymerization reaction may be selected so as to obtain a variety of polymer products, as desired, and that the several separate effective variables may be adapted to each other to provide a set of conditions satisfactory with respect to the particular olefine-containing source material most conveniently and inexpensively obtainable, according to the character of the products ultimately desired to be produced therefrom.

Accordingly, the suitable choice of the conditions of temperature and of olefine content of the hydrocarbon mixture undergoing polymerization, as determined by the character of the products desired and in accordance with the particular nature of the olefine-containing source material employed, is a particular feature of our invention.

In characterizing, generally, the polymers produced by the practice of the process of our invention as hereinabove particularly described, we may note the following:

(a) They are of inordinately high viscosity index, as compared with the viscosity indices of any product heretofore obtained from an isobutene-normal butene polymerization reaction; thus they may be of at least 60 to 70 viscosity index, if desired, and are in many cases above 100 viscosity index, if desired;

(b) They are absolutely water-white and crystal-clear;

(c) They are of somewhat higher volatility than products of corresponding viscosity prepared by polymerizing olefines of 10, 12 and higher carbon atoms per molecule;

(d) They are completely free of wax or of wax cloud when cooled to as low as −100° F.;

(e) They depolymerize, that is, they decompose, at somewhat lower temperature than do products of corresponding viscosities prepared by polymerizing olefines of 10, 12 and higher carbon atoms per molecule;

(f) They are completely olefinic in composition, and contain no aromatic or hydroaromatic cyclic bodies;

(g) They contain substantial proportions of very high molecular weight hydrocarbons, non-distillable without decomposition;

(h) They are oily viscous liquids, rather than of plastic character, as are for example, those strictly isobutene polymers prepared by the slow polymerization of pure isobutene at −100° F. or thereabouts;

(i) Their viscosity at 210° F. is of the order of 40 to 10,000 seconds Saybolt Universal, according to the fraction or cut under consideration, rather than of the order of 1,000,000+ seconds Saybolt Universal at 210° F., as are the strictly isobutene polymers prepared by the slow polymerization of pure isobutene at −100° F. or thereabouts.

In characterizing, generally, the saturated products prepared by completely saturating the olefinic viscous polymers of our invention, as by a non-destructive hydrogenation reaction, we may note the following:

(j) They correspond to those properties of the olefinic hydrocarbons particularly identified above under paragraph (a), (b), (c), (d), (g), (h) and (i), and in addition;

(k) They are completely lacking in all taste and odor, even when warmed to body temperature or somewhat above.

(l) They have a viscosity-gravity constant of below 0.78, as the term "viscosity-gravity constant" is employed for example, by Hill and Coats in Industrial & Engineering Chemistry, volume 20, page 641 (1928) and by Ferris, Berkhimer & Henderson in Industrial & Engineering Chemistry, volume 23, page 753 (1931);

(m) The viscosity of the viscous olefine polymers is substantially unchanged upon hydrogenating them; the viscosity-gravity constants of the hydrogenated products are lower than those of the corresponding entirely olefinic polymers; the viscosity-gravity constant decreases with increasing viscosity, both in the olefinic and in the hydrogenated products.

As will be apparent to one skilled in the art, these olefine polymers and their saturated analogs are adaptable to a wide variety of uses, among which we may mention: their suitability as gear and motor oils, either alone or in admixture with refined naturally occurring petroleum oils; their suitability in raising the viscosity index of refined motor oils of lower viscosity index, by blending them therewith in suitable proportions; as technical or medicinal white oils; as lubricants for refrigerating machinery; etc. The novel and unusual properties of the compositions of our invention, as the same are listed hereinabove, will indicate the variety of uses to which they may be put, many of which are not entirely satisfactorily fulfilled by naturally occurring mineral oils or the synthetic hydrocarbon oils heretofore available.

While we have not hereinabove particularly discussed the means of effecting complete saturation of the entirely olefinic products prepared in accordance with our invention, we may observe, in general, that an ordinarily acceptable non-destructive hydrogenation system as the same is employed, for example, in the partial or complete hydrogenation of the edible vegetable oils, is suitable for the complete hydrogenation of our viscous olefine polymers and the production of entirely paraffinic compositions of the characteristics enumerated above. This hydrogenation reaction is ordinarily carried out with the polymers in liquid phase, and catalytic nickel is suitably employed as hydrogenation catalyst; the temperature of the reaction may be between 200° F. and 450° F., generally about 350° F., and the hydrogen pressure imposed upon the mixture undergoing hydrogenation may be from about 60 to about 500 pounds gauge, suitably about 150 pounds gauge. We find, in general, that the particular conditions obtaining during the hydrogenation reaction do not materially affect the character or properties of the produced saturated liquid hydrocarbons, but may note that the quantity of hydrogenation catalyst employed is usually somewhat greater than is required to completely hydrogenate the edible vegetable and the like natural oils.

Although certain specific temperatures, concentrations, conditions and operations have been described hereinabove in detail in connection with the practice of the processes of our invention, and although certain specific compositions, both olefinic and paraffinic, have been described hereinabove as representative of the products of our invention, it is to be understood that such conditions, operations, and compositions are merely illustrative of the processes and of the products of our invention and are not to be taken as limiting the same. Numerous changes and modifications may be made in both the processes and the products as will become apparent to those skilled in the art, and all such changes and modifications as come within the scope of the appended claims are embraced thereby.

We claim:
1. The process of producing synthetic hydrocarbon oils of high viscosity index and of higher than 40 seconds Saybolt Universal viscosity at 210° F., having the properties of viscous liquids rather than of plastic solids, which comprises bringing in contact with anhydrous aluminum chloride, in liquid phase, an initial hydrocarbon material consisting substantially entirely of hydrocarbons of 3, 4 and 5 carbon atoms per molecule and consisting of hydrocarbons of 4 carbon atoms per molecule in major part, the said initial hydrocarbon material containing both normal olefines and iso-olefines and being accompanied by corresponding saturated aliphatic hydrocarbons, at a temperature not above about 120° F. but sufficiently high to cause the polymerization of both normal olefines and iso-olefines, separating the produced polymerized olefines and accompanying unpolymerized olefines from the anhydrous aluminum chloride and hydrocarbons associated with it in loose chemical combination and then separating the produced olefine polymers from unpolymerized hydrocarbons.

2. The process of producing synthetic hydrocarbon oils of high viscosity index and of higher than 40 seconds Saybolt Universal viscosity at 210° F., having the properties of viscous liquids rather than of plastic solids, which comprises bringing in contact with anhydrous aluminum chloride as polymerizing catalyst, in liquid phase, an initial hydrocarbon material consisting substantially entirely of normal butenes, iso-butene and butane, at a temperature not above about 120° F. but sufficiently high to cause the polymerization of both the normal butenes and iso-butene, separating the produced butene polymers and butane from the polymerizing catalyst and associated hydrocarbons in loose chemical combination therewith and then separating the produced polymers from the butane.

3. The process of producing synthetic hydrocarbon oils of high viscosity index and of higher than 40 seconds Saybolt Universal viscosity at 210° F., having the properties of viscous liquids rather than of plastic solids, which comprises substantially completely removing all sulfur compounds from a hydrocarbon mixture consisting substantially entirely of hydrocarbons of 3, 4 and 5 carbon atoms per molecule and consisting of hydrocarbons of 4 carbon atoms per molecule in major part, the said initial hydrocarbon mixture containing both normal olefines and iso-olefines and being accompanied by corresponding saturated aliphatic hydrocarbons, bringing the sulfur-free hydrocarbon mixture in contact with anhydrous aluminum chloride, in liquid phase, and at a temperature within the range 0° F. to 120° F., to cause the polymerization of both normal olefines and iso-olefines, separating the produced polymerized olefines and accompanying unpolymerized hydrocarbons from the anhydrous aluminum chloride and the hydrocarbons associated with it in loose chemical combination, and then separating the produced olefines polymers from unpolymerized hydrocarbons.

4. A process of producing synthetic hydrocarbon oils of high viscosity index and of higher than 40 seconds Saybolt Universal viscosity at 210° F., which comprises cooling and liquefying a hydrocarbon material consisting substantially entirely of hydrocarbons of 3, 4 and 5 carbon atoms per molecule and consisting of hydrocarbons of 4 carbon atoms per molecule in major part, the said hydrocarbon material containing both normal olefines and iso-olefines and being accompanied by corresponding saturated aliphatic hydrocarbons, passing the cooled hydrocarbon material in liquid phase downwardly through a reaction zone containing anhydrous aluminum chloride to cause the formation of viscous polymers, maintaining the said reaction zone at a temperature sufficiently high to cause the polymerization of both normal and iso-olefines but not above about 120° F., withdrawing produced polymers, unpolymerized hydrocarbons and aluminum chloride sludge from the reaction zone, separating by gravity the major part of the aluminum chloride sludge, passing produced polymers and unpolymerized hydrocarbons in contact with an adsorbent agent to completely remove all traces of aluminum chloride sludge and separating the produced olefine polymers from unpolymerized hydrocarbons.

5. A process of producing saturated hydrocarbon oils of high viscosity index and of higher than 40 seconds Saybolt Universal viscosity at 210° F., having the properties of viscous liquids rather than of plastic solids, which comprises bringing in contact with anhydrous aluminum chloride as polymerizing catalyst, in liquid phase and at a temperature sufficiently high to cause the polymerization of both normal olefines and iso-olefines but not higher than about 120° F., an initial hydrocarbon material consisting substantially entirely of hydrocarbons of 3, 4 and 5 carbon atoms per molecule and consisting of hydrocarbons of 4 carbon atoms per molecule in major part, the said initial hydrocarbon material containing both normal olefines and iso-olefines and being accompanied by corresponding saturated aliphatic hydrocarbons, to cause the polymerization of both normal olefines and iso-olefines, separating the produced polymerized olefines and accompanying unpolymerized hydrocarbons from the polymerizing catalyst and associated hydrocarbons in loose chemical combination therewith, separating the produced olefine polymers from unpolymerized hydrocarbons and hydrogenating the olefine polymers by catalytic hydrogenation of the non-destructive type.

6. A process of preparing high molecular weight polymerization products having the properties of viscous lubricating oils rather than of plastic solids, comprising cracking a hydrocarbon oil to produce a mixture of normally liquid and gaseous products, separating from said cracked products the fraction consisting substantially entirely of normal butenes, iso-butene, and butane, treating said fraction in liquid phase with aluminum chloride as the polymerizing agent at a temperature between about 32° F. and 100° F. and separating from the resulting mixture the said high molecular weight polymerization products.

7. High molecular weight polymerization products having the properties of viscous lubricating oils rather than of plastic solids, prepared according to the process which comprises: cracking a hydrocarbon oil to produce a mixture of normally liquid and gaseous products, separating from said cracked products the fraction consisting substantially entirely of normal butenes, iso-butene and butane, treating said fraction in liquid phase with aluminum chloride as the polymerizing agent at a temperature between about 32° F. and 100° F., and separating from the resulting mixture the said high molecular weight polymerization products.

8. A process of producing synthetic hydrocarbons possessing the properties of viscous liquid oils rather than of plastic solids, of high viscosity index and of a viscosity above 40 seconds Saybolt Universal at 210° F., from a liquefied normally gaseous hydrocarbon material consisting substantially entirely of normal butenes, iso-butene and butane, which comprises cooling the said liquefied hydrocarbon material to a subatmospheric temperature and passing it in liquid phase through an anhydrous aluminum chloride polymerization zone maintained at a temperature sufficient to cause the polymerization of both normal butenes and iso-butene but below about 80° F., to cause the formation of viscous butene polymers, removing substantially all aluminum chloride and aluminum chloride sludge, separating unpolymerized normally gaseous hydrocarbons from the produced polymers, and cooling and recycling a part of the unpolymerized hydrocarbons, in liquid phase, into and through the said polymerization zone together with fresh liquefied normal butenes, iso-butene and butane in order to maintain the temperatures obtaining in the polymerization zone at a temperature below about 80° F.

9. A process of producing synthetic hydrocarbons possessing the properties of viscous liquid oils rather than of plastic solids, of high viscosity index and of a viscosity above 40 seconds Saybolt Universal at 210° F., from a liquefied normally gaseous hydrocarbon material consisting substantially entirely of normal butenes, iso-butene and butane, which comprises cooling the said liquefied hydrocarbon material to a subatmospheric temperature and passing it in liquid phase through an anhydrous aluminum chloride polymerization zone maintained at a temperature sufficient to cause the polymerization of both normal butenes and iso-butene but below about 40° F., to cause the formation of viscous butene polymers, removing substantially all aluminum chloride and aluminum chloride sludge, separating unpolymerized normally gaseous hydrocarbons from the produced polymers, and cooling and recycling a part of the unpolymerized hydrocarbons, in liquid phase, into and through the said polymerization zone together with fresh liquefied normal butenes, iso-butene and butane in order to maintain the temperatures obtaining in the polymerization zone at a temperature below about 40° F.

10. A process of producing synthetic hydrocarbons possessing the properties of viscous liquid oils rather than of plastic solids, of high viscosity index and of a viscosity above 40 seconds Saybolt Universal at 210° F., from a liquefied normally gaseous hydrocarbon material consisting substantially entirely of normal butenes, iso-butene and butane, which comprises cooling the said liquefied hydrocarbon material to a subatmospheric temperature and passing it in liquid phase through an anhydrous aluminum chloride polymerization zone maintained at a temperature within the range 0° F. to 80° F. to cause the formation of viscous butene polymers of high viscosity index, removing substantially entirely all aluminum chloride and aluminum chloride sludge, separating unpolymerized normally gaseous hydrocarbons from the produced polymers, and cooling and recycling a part of the unpolymerized hydrocarbons in liquid form into and through the polymerization zone together with fresh liquefied normal butenes, iso-butene and butane in order to maintain the temperatures obtaining in the polymerization zone within the range 0° F. to 80° F.

11. A synthetic hydrocarbon oil composed substantially entirely of acyclic hydrocarbons and containing substantially no aromatic or hydroaromatic hydrocarbons, having a viscosity index of above 60, a viscosity at 210° F. within the range 40 to 10,000 seconds Saybolt Universal, a viscosity-gravity constant below 0.78, having the characteristics of a viscous liquid rather than of a plastic solid, being substantially free of wax and wax cloud at temperatures as low as —100° F., prepared by the process which comprises: bringing in contact with anhydrous aluminum chloride as polymerizing catalyst an initial hydrocarbon material consisting substantially entirely of hydrocarbons of 3, 4 and 5 carbon atoms per molecule and consisting of hydrocarbons of 4 carbon atoms per molecule in major part, said initial hydrocarbon material containing both normal olefines and iso-olefines and being accompanied by corresponding saturated aliphatic hydrocarbons, in liquid phase and at a temperature below about 120° F. but sufficient to cause the polymerization of both normal olefines and iso-olefines, separating the produced polymerized olefines together with accompanying unpolymerized olefines and saturated aliphatic hydrocarbons from aluminum chloride sludge prior to any contact of water therewith, and then separating the produced olefine polymers from unpolymerized hydrocarbons.

12. A synthetic hydrocarbon oil composed substantially entirely of acyclic hydrocarbons and containing substantially no aromatic or hydroaromatic hydrocarbons, having a viscosity index of about 100, a viscosity at 210° F. within the range 300 to 10,000 seconds Saybolt Universal, a viscosity-gravity constant below 0.78, having the characteristics of a viscous liquid rather than of a plastic solid, being substantially free of wax and wax cloud at temperatures as low as —100° F., prepared by the process which comprises: bringing in contact with anhydrous aluminum chloride as polymerizing catalyst an initial hydrocarbon material consisting substantially entirely of normal butenes, iso-butene and butane, said initial hydrocarbon material containing preponderant amounts of butane, in liquid phase and at a temperature below about 80° F. but sufficient to cause the polymerization of both normal olefines and iso-olefines, separating the produced polymerized olefines together with accompanying unpolymerized olefines and saturated aliphatic hydrocarbons from aluminum chloride sludge prior to any contact of water therewith, separating the produced olefine polymers from unpolymerized hydrocarbons, and then removing by vaporization sufficient of the more volatile polymers to provide a residue having a viscosity at 210° F. of more than 300 but less than 10,000 seconds Saybolt Universal.

13. A synthetic hydrocarbon oil composed substantially entirely of acyclic hydrocarbons and containing substantially no aromatic or hydroaromatic hydrocarbons, having a viscosity index of above 100, a viscosity at 210° F. of about 3,000 seconds Saybolt Universal, a viscosity-gravity constant below 0.78, having the characteristics of a viscous liquid rather than of a plastic solid, being substantially free of wax and wax cloud at temperatures as low as —100° F., prepared by the process which comprises: bringing in contact with anhydrous aluminum chloride as polymerizing catalyst an initial hydrocarbon material consisting substantially entirely of normal butenes, iso-butene and butane, said initial hydrocarbon material containing preponderant amounts of butane, in liquid phase and at a temperature below about 80° F. but sufficient to cause the ploymerization of both normal olefines and iso-olefines, separating the produced polymerized olefines together with accompanying unpolymerized olefines and saturated aliphatic hydrocarbons from aluminum chloride sludge prior to any contact of water therewith, separating the produced olefine polymers from unpolymerized hydrocarbons, and then removing by vaporization sufficient of the more volatile polymers to provides a residue having a viscosity at 210° F. of about 3,000 seconds Saybolt Universal.

14. A synthetic hydrocarbon oil composed substantially entirely of acyclic saturated paraffinic hydrocarbons and containing substantially no aromatic or hydroaromatic hydrocarbons, having a viscosity index of above 100, a viscosity at 210° F. within the range 300 to 10,000 seconds Saybolt Universal, a viscosity-gravity constant below 0.78, having the characteristics of a viscous liquid rather than of a plastic solid, being substantially free of wax and wax cloud at temperatures as low as —100° F., prepared by the process which comprises: bringing in contact with anhydrous aluminum chloride as polymerizing catalyst an initial hydrocarbon material consisting substantially entirely of normal butenes, iso-butene and butane, said initial hydrocarbon material containing preponderant amounts of butane, in liquid phase and at a temperature below about 80° F. but sufficient to cause the polymerization of both normal olefines and iso-olefines, separating the produced polymerized olefines together with accompanying unpolymerized olefines and saturated aliphatic hydrocarbons from aluminum chloride sludge prior to any contact of water therewith, separating the produced olefine polymers from unpolymerized hydrocarbons, removing by vaporization sufficient of the more volatile polymers to provide a residue having a viscosity at 210° F. of more than 300 but less than 10,000 seconds Saybolt Universal, and completely hydrogenating the olefine polymers by hydrogenation of the saturating non-destructive type.

MELVIN M. HOLM.
ARTHUR L. LYMAN.
MARVIN F. MILLER.

CERTIFICATE OF CORRECTION.

Patent No. 2,224,349. December 10, 1940.

MELVIN M. HOLM, ET AL.

It is hereby certified that error appears in the printed specification of the above numbered patent requiring correction as follows: Page 3, first column, line 13, for "iso butane" read --iso butene--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.